(12) United States Patent
Barlier

(10) Patent No.: US 6,745,446 B1
(45) Date of Patent: Jun. 8, 2004

(54) METHOD FOR PRODUCING MECHANICAL PARTS FROM AN ASSEMBLY OF LAYERS WHICH ARE TURNED OVER DURING MACHINING, AND THE ELEMENTAL LAMINATIONS AND ASSEMBLED PARTS PRODUCED

(75) Inventor: Claude Barlier, Coinches (FR)

(73) Assignee: C.I.R.T.E.S. (Centre d'Ingenierie de Recherche et de Transfert de l'Esstin a Saint-Die), Saint Die (FR)

( * ) Notice: Subject to any disclaimer, the term of this patent is extended or adjusted under 35 U.S.C. 154(b) by 0 days.

(21) Appl. No.: 09/856,208

(22) PCT Filed: Nov. 15, 1999

(86) PCT No.: PCT/FR99/02788

§ 371 (c)(1),
(2), (4) Date: Aug. 21, 2001

(87) PCT Pub. No.: WO00/31599

PCT Pub. Date: Jun. 2, 2000

(30) Foreign Application Priority Data

Nov. 19, 1998 (FR) .............................. 98 14688

(51) Int. Cl.[7] .............................................. B23P 17/00
(52) U.S. Cl. .......................................... 29/412; 29/418
(58) Field of Search .................... 29/412, 415, 417, 29/418; 700/197, 163, 119

(56) References Cited

U.S. PATENT DOCUMENTS

| | | | |
|---|---|---|---|
| 3,612,387 A | | 10/1971 | Rathbun |
| 3,790,152 A | | 2/1974 | Parsons |
| 3,932,923 A | * | 1/1976 | DiMatteo |
| 4,001,069 A | | 1/1977 | DiMatteo |
| 4,675,825 A | * | 6/1987 | DeMenthon |
| 4,752,352 A | * | 6/1988 | Feygin |
| 5,015,312 A | | 5/1991 | Kinzie |
| 5,031,483 A | | 7/1991 | Weaver |
| 5,354,414 A | | 10/1994 | Feygin |
| 5,514,232 A | * | 5/1996 | Burns |
| 5,663,883 A | | 9/1997 | Thomas et al. |
| 5,765,137 A | * | 6/1998 | Lee |
| 5,793,015 A | | 8/1998 | Walczyk |
| 5,847,958 A | * | 12/1998 | Shaikh et al. |
| 6,136,132 A | * | 10/2000 | Kinzie |
| 6,324,438 B1 | * | 11/2001 | Cormier et al. |

FOREIGN PATENT DOCUMENTS

| | | | |
|---|---|---|---|
| DE | 3711470 | | 10/1988 |
| DE | 4041105 | | 6/1992 |
| EP | 0585502 | | 3/1994 |
| EP | 0606627 | | 7/1994 |
| EP | 0655317 | | 5/1995 |
| EP | 0655668 | | 5/1995 |
| EP | 0738583 | | 10/1996 |
| EP | 0811457 | | 12/1997 |
| FR | 2233137 | | 1/1975 |
| FR | 2673302 | | 8/1992 |
| FR | 2750064 | | 12/1997 |
| GB | 2011814 | * | 7/1979 |
| WO | WO/9112120 | | 8/1991 |
| WO | WO/9508416 | | 3/1995 |

OTHER PUBLICATIONS

US 2003/0006001 A1 (Yang et al.)–Published: Jan. 9, 2003.
Patent Abstracts of Japan, vol. 016, No. 370 (M–1292) Published: Aug. 10, 1992 (pertaining to JP 04 118221 (Fujitsu Ltd.), published Apr. 20, 1992).
Patent Abstracts of Japan, vol. 1995, No. 11 Published: Dec. 26, 1995 (pertaining to JP 07 214274 (U Mold:KK), published Aug. 15, 1995).

* cited by examiner

*Primary Examiner*—Douglas Olms
*Assistant Examiner*—Steven Blount
(74) *Attorney, Agent, or Firm*—Gary M. Cohen

(57) ABSTRACT

Mechanical parts and other objects are produced from a specific computer-assisted design by successive steps including producing pieces of the part or object in elementary layers or strata, building up the collection of layers, and assembling the layers. The layers are derived from previous decomposition of the part or object along specific planes, and one or several steps. At least a portion of one of the layers is turned over (by 180°) after one of its surfaces has been machined, and another surface is machined after the layer has been turned over.

15 Claims, 3 Drawing Sheets

METHOD FOR PRODUCING MECHANICAL PARTS FROM AN ASSEMBLY OF LAYERS WHICH ARE TURNED OVER DURING MACHINING, AND THE ELEMENTAL LAMINATIONS AND ASSEMBLED PARTS PRODUCED

BACKGROUND OF THE INVENTION

The present invention generally relates to an improved method for producing mechanical parts and objects, particularly prototypes, from a specific computer-aided design, to the elemental laminations produced by such a method, and to the prototypes obtained by assembling such elemental laminations.

Known methods for producing a mechanical part or object, including prototypes, from a specific computer-aided design generally include the successive steps of manufacturing the part in elemental layers or laminations, building up the collection of layers and assembling the layers. The laminations result from a prior breakdown of the part along plural planes, and one or more defined steps.

A rapid prototyping method of this general type is described in European Patent EP-0 585 502-B1, the content of which is incorporated herein by reference, and is known by the trademark "STRATOCONCEPTION".

The method of the present invention is fully compatible with the applications specified in European Patent EP-0 585 502. In practice, however, the disclosed rapid prototyping method has been found to have limits in the production of parts with complex shapes. This is particularly so when the micromachining tool which is used to perform the method has to, or should produce contours on one face of a lamination and then on the other face of the lamination being machined.

The object of the present invention is to provide a method which permits the machining of laminations having such complex shapes.

SUMMARY OF THE INVENTION

In accordance with the present invention, this is achieved with an improved method for producing mechanical parts and objects from a specific computer-aided design. The method generally includes the successive steps of manufacturing the parts in elemental layers or laminations, building up the collection of layers, and assembling the layers to form the part. The elemental layers or laminations result from a prior breakdown of the part along a plurality of planes, and one or more defined steps. At least portions of a lamination are turned through 180° (i.e., turned over) after one of its faces has been machined, so that the other face of the lamination can be machined after the lamination has been turned over. In an alternative implementation of the method of the present invention, the entire lamination will be subjected to the foregoing operation.

In yet another alternative implementation of the method of the present invention, the lamination is cut into two or more sub-laminations, along one or more cutting planes which are roughly vertical. Only those sub-laminations which contain a portion which cannot be machined in the customary way are turned over.

The present invention will be better understood with reference to the description which is provided hereafter, together with the following drawings.

DETAILED DESCRIPTION OF THE INVENTION

Figure 1:
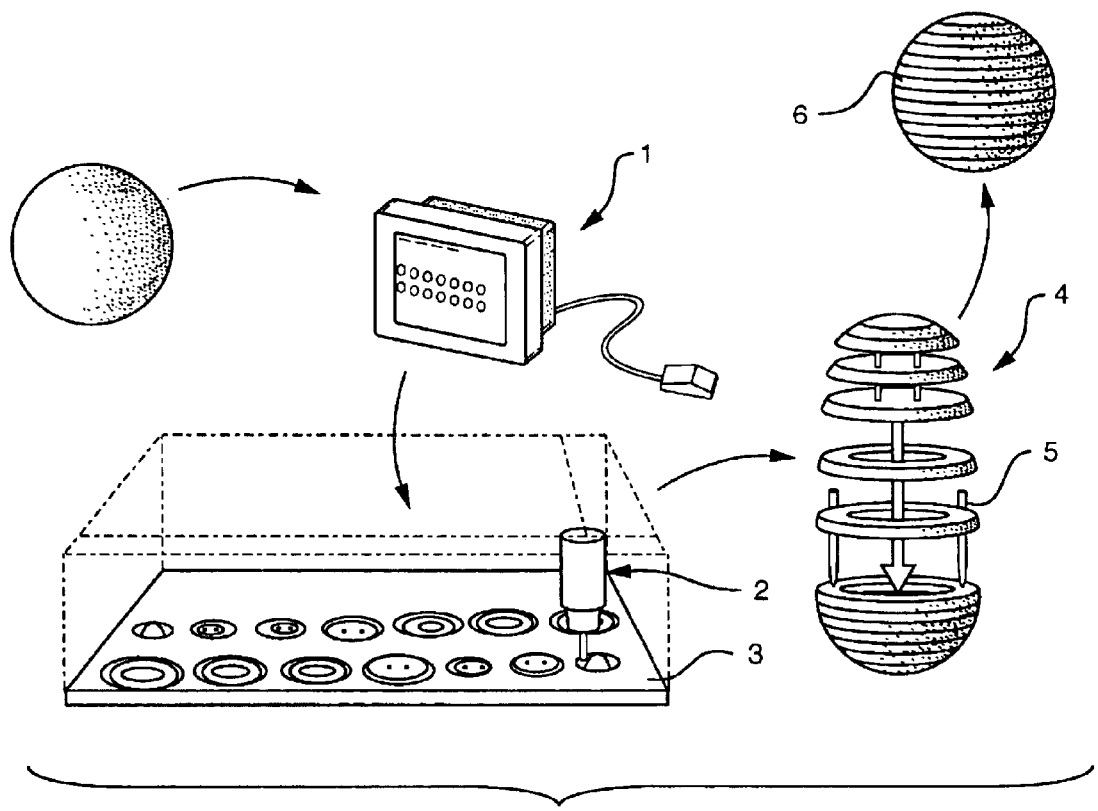
FIG. 1 is a schematic representation of the general steps for implementing the method of the present invention.

FIG. 1 generally illustrates a process for producing a mechanical part, in the illustrated case, a prototype, from a specific computer-aided design. Using specific software (1), the part that is to be prototyped is cut into laminations. The laminations are machined by rapid micromachining (2), which is controlled by the software (1), from a material (3) in sheet form. The various laminations are assembled into a collection (4) of inserts (5) to finally obtain the prototype (6), after finishing.

The software (1) governs selection of the planes for the slicing/stratification of the laminations, the lamination profiling step, any scaling ratios, the precision and the position for the inserts. Once the various sheet parameters (i.e, dimensions, material, choice of direction, clearance, etc.) and the machining parameters (i.e., cutting rate, cutter diameter, etc.) have been input, the entire machining program is transmitted by the software (1), which controls the cutting robot (i.e., the apparatus (2) which performs the micromachining).

Figure 2:
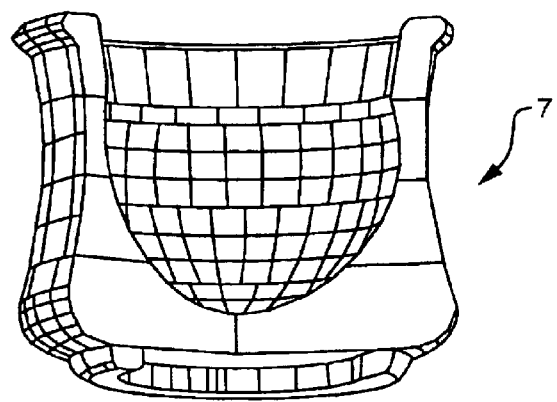
FIG. 2 is a perspective view of a theoretical part having complex shapes which can be broken down into laminations in accordance with the method of the present invention.

Such methods have been found to be limited when producing parts having complex shapes, such as the theoretical part (7) shown in FIG. 2, for example. The part (7) can be broken down into subassemblies. In practice, however, machining of the resulting laminations will exhibit difficulties of different kinds.

Figure 2A:
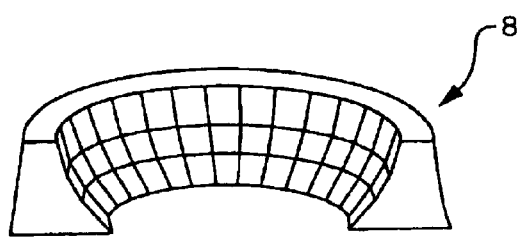
FIGS. 2A to 2G are perspective views of the various laminations which collectively form the part of FIG. 2.

FIG. 2A shows a section (8) of the part (7) which is of the classical type, and which can be machined from sheet stock by micromachining from the top of the sheet (i.e., as shown in FIG. 1).

Figure 2B:
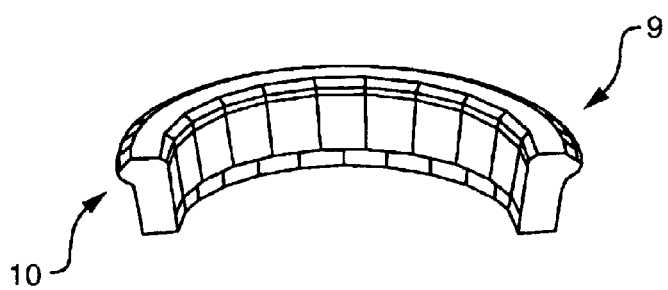
Figure 2C:
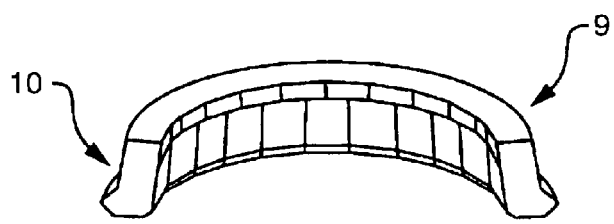
Figure 2D:
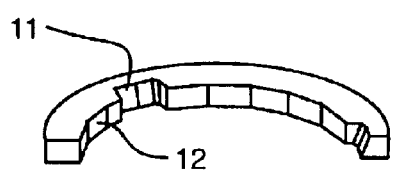
Figure 2E:
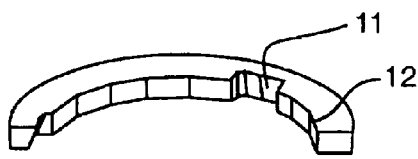

FIGS. 2B and 2C show a more complex section (9) of the part (7). The section (9) is produced by machining (2) areas of the section (9) from above (see, FIG. 2B). In accordance with the present invention, the section (9) is turned over (see, FIG. 2C) so that areas of the section (9), such as the outside and the shoulder areas (10), can then be machined. FIGS. 2D and 2E similarly illustrate another section of the part (7), which is turned over to machine areas which respectively have a positive clearance (11) and a negative clearance (12).

Figure 2F:
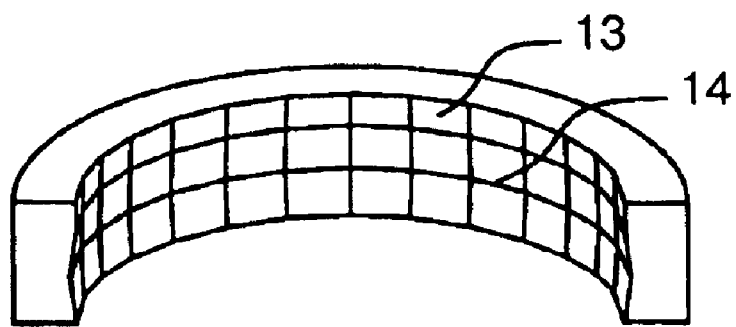

For sections such as the section shown in FIG. 2F, the cutter cannot work either from above or from the underside of the section. In such cases, it is necessary to subject the section to a sub-lamination step. As an example, for the section illustrated in FIG. 2F, such sub-lamination is performed along the cutting planes (13, 14), so as to obtain three laminations. One of the resulting sub-laminations can then be produced in accordance with the present invention, by turning the sub-lamination over.

Figure 2G:
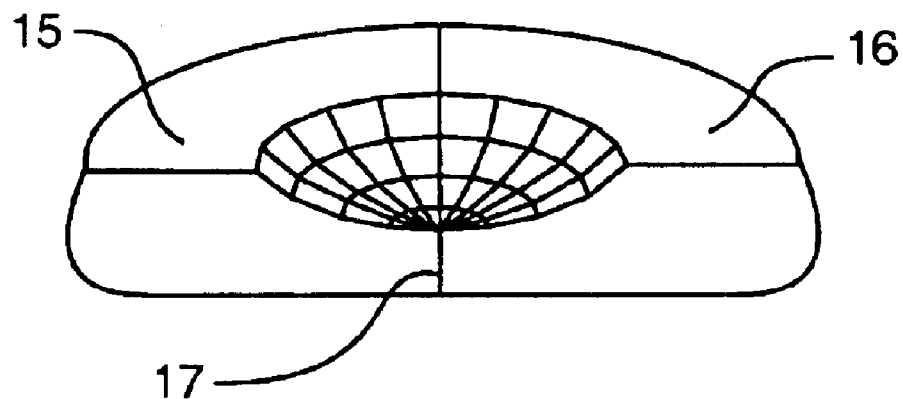

An alternative to the sub-lamination step shown in FIG. 2F is shown in FIG. 2G. Of greatest significance in this case is that the elemental lamination is cut, for example, into the two portions (15, 16) shown. Each of the portions (15, 16) can then be machined separately, with a turn-over step in accordance with the present invention, and finally assembled along the cutting plane (17), which is generally vertical.

In general, the following is noted. To make the second face easier to machine after a lamination, a sub-lamination, or a half-lamination has been turned over, holding areas will be formed during the first cut. These areas will be eliminated by machining during the second machining phase (i.e., after the turning-over step), so as to completely free the part. Positioning of the laminations during the turning-over operation is taken into consideration by the method of manufacture and by the software (1). The holes intended for the inserts provided according to the method described by European Patent EP 0 585 502 can be used for positioning, as can the positioning and assembly apparatus provided according to the method which forms the subject of a patent application filed simultaneously by the applicant. As an alternative, the positioning of the laminations during machining can be taken into consideration via inserts determined by the software (1), or by a holding array. In general, all of the foregoing operations entail recognition of the contours of the part beforehand, by computer processing involving the specific software which is used.

What is claimed is:

1. A method for producing a mechanical part, including prototype parts, from a specific computer-aided design, comprising the steps of:

manufacturing the part as a plurality of elemental layers, wherein the elemental layers are defined by prior breakdown of the part along a plurality of planes, and wherein the plurality of elemental layers includes a machined layer;

machining first surface portions of the machined layer, forming holding areas during the machining of the first surface portions;

turning over the machined layer, through 180°, after the first surface portions have been machined;

machining second surface portions after the turning over of the machined layer, thereby making the second surface portions easier to machine after the machined layer has been turned over, and eliminating the holding areas formed during the machining of the first surface portions by the machining of the second surface portions, thereby completely freeing the machined layer for subsequent assembly of the part;

building up the plurality of elemental layers, including the machined layer; and assembling the built up plurality of layers to produce the part.

2. The method of claim 1 which further includes the steps of:

cutting the machined layer into two portions along a cutting plane;

separately machining each, of the portions; and assembling the separately machined portions along the cutting plane.

3. The method of claim 2 wherein the cutting plane is substantially vertical.

4. The method of claim 1 wherein one of the plurality of elemental layers forms a section having surface portions which cannot be machined from a top or a bottom of the section, and which further includes the steps of:

separating the section into a plurality of sub-layers so that each of the sub-layers can be machined from the top or the bottom, wherein the plurality of sub-layers includes a machined sub-layer; and machining first surface portions of the machined sub-layer, turning over the machined sub-layer, and machining second surface portions of the machined sub-layer after the turning over of the machined sub-layer.

5. The method of claim 1 wherein the assembly step further includes the step of positioning the plurality of layers for producing the part using an apparatus for assembly of the part.

6. An elemental lamination for producing a mechanical part, including prototype parts, which is manufactured as a plurality of elemental layers, wherein the elemental layers are defined by prior breakdown of the part along a plurality of planes, wherein the plurality of elemental layers includes the lamination, and wherein the lamination is produced by a method comprising the steps of:

machining first surface portions of the lamination, forming holding areas during the machining of the first surface portions;

turning over the lamination, through 180°, after the first surface portions have been machined;

machining second surface portions after the turning over of the lamination, thereby making the second surface portions easier to machine after the lamination has been turned over, and eliminating the holding areas formed during the machining of the first surface portions by the machining of the second surface portions, thereby completely freeing the lamination for subsequent assembly of the part;

building up the plurality of elemental layers, including the lamination; and assembling the built up plurality of layers to produce the part.

7. The elemental lamination of claim 6 which is produced by a method which further includes the steps of:

cutting the lamination into two portions along a cutting plane;

separately machining each of the portions; and assembling the separately machined portions along the cutting plane.

8. The elemental lamination of claim 7 wherein the cutting plane is substantially vertical.

9. The elemental lamination of claim 6 wherein one of the plurality of elemental layers forms a section having surface portions which cannot be machined from a top or a bottom of the section, and which is produced by a method which further includes the steps of:

separating the section into a plurality of sub-layers so that each of the sub-layers can be machined from the top or the bottom, wherein the plurality of sub-layers includes a machined sub-layer; and machining first surface portions of the machined sub-layer, turning over the machined sub-layer, and machining second surface portions of the machined sub-layer after the turning over of the machined sub-layer.

10. The elemental lamination of claim 6 which is produced by a method wherein the assembly step further includes the step of positioning the plurality of layers for producing the part using an apparatus for assembly of the part.

11. A mechanical part, including prototype parts, which is comprised of an assembly of manufactured laminations, wherein the laminations are defined by prior breakdown of the part along a plurality of planes, and wherein the assembly of laminations includes a machined lamination produced by a method comprising the steps of:

machining first surface portions of the machined lamination, forming holding areas during the machining of the first surface portions;

turning over the machined lamination, through 180°, after the first surface portions have been machined;

machining second surface portions after the turning over of the machined lamination, thereby making the second surface portions easier to machine after the machined lamination has been turned over, and eliminating the holding areas formed during the machining of the first surface portions by the machining of the second surface portions, thereby completely freeing the machined lamination for subsequent assembly of the part;

building up the assembly of laminations, including the machined lamination; and assembling the built up assembly of laminations to produce the part.

12. The mechanical part of claim 11 wherein the machined lamination is produced by a method which further includes the steps of:

cutting the machined lamination into two portions along a cutting plane;

separately machining each of the portions; and assembling the separately machined portions along the cutting plane.

13. The mechanical part of claim 12 wherein the cutting plane is substantially vertical.

14. The mechanical part of claim 11 wherein one of the assembly of laminations forms a section having surface portions which cannot be machined from a top or a bottom of the section, and which is produced by a method which further includes the steps of:

separating the section into a plurality of sub-layers so that each of the sub-layers can be machined from the top or the bottom, wherein the plurality of sub-layers includes a machined sub-layer; and machining first surface portions of the machined sub-layer, turning over the machined sub-layer, and machining second surface portions of the machined sub-layer after the turning over of the machined sub-layer.

15. The mechanical part of claim 11 wherein the machined lamination is produced by a method wherein the assembly step further includes the step of positioning the assembly of laminations for producing the part using an apparatus for assembly of the part.

* * * * *